(12) United States Patent
Wang et al.

(10) Patent No.: US 11,754,699 B2
(45) Date of Patent: Sep. 12, 2023

(54) NON-CONTACT MOTION DETECTION METHOD, MOTION DETECTION DEVICE AND EMERGENCY DETECTION METHOD

(71) Applicant: Wistron Corporation, New Taipei (TW)

(72) Inventors: Kuo-Hsing Wang, New Taipei (TW); Chih-Ping Wu, New Taipei (TW)

(73) Assignee: Wistron Corporation, New Taipei (TW)

(*) Notice: Subject to any disclaimer, the term of this patent is extended or adjusted under 35 U.S.C. 154(b) by 260 days.

(21) Appl. No.: 17/031,897

(22) Filed: Sep. 25, 2020

(65) Prior Publication Data
US 2022/0066016 A1 Mar. 3, 2022

(30) Foreign Application Priority Data

Sep. 1, 2020 (TW) ................. 109129816

(51) Int. Cl.
*G01S 13/62* (2006.01)
*G01S 7/35* (2006.01)
*G01S 13/58* (2006.01)

(52) U.S. Cl.
CPC .............. *G01S 13/62* (2013.01); *G01S 7/352* (2013.01); *G01S 13/583* (2013.01)

(58) Field of Classification Search
CPC .................................................. G08B 21/043
See application file for complete search history.

(56) References Cited

U.S. PATENT DOCUMENTS

| 7,916,066 | B1 | 3/2011 | Osterweil | |
|---|---|---|---|---|
| 10,809,743 | B1* | 10/2020 | McCusker | B64C 13/18 |
| 11,074,800 | B2 | 7/2021 | Li et al. | |
| 2014/0362213 | A1* | 12/2014 | Tseng | G06V 20/52 |
| | | | | 348/143 |

(Continued)

FOREIGN PATENT DOCUMENTS

| CN | 110946587 | 4/2020 |
|---|---|---|
| JP | 2012005745 | 1/2012 |

(Continued)

OTHER PUBLICATIONS

Leone A., Diraco G., Siciliano P. Detecting falls with 3D range camera in ambient assisted living applications: A preliminary study. Med. Eng. Phys. 2011;33:770-781 (Year: 2011).*

(Continued)

*Primary Examiner* — Timothy A Brainard
*Assistant Examiner* — Hailey R Le
(74) *Attorney, Agent, or Firm* — JCIPRNET (57) ABSTRACT

A non-contact motion detection method, a motion detection device and an emergency detection method are provided. The non-contact motion detection method includes: receiving a reflection signal from a field to obtain a raw data signal; determining that a first event occurs in the field according to an energy value of the raw data signal, and providing a first alarm; determining that a second event occurs in the field according to an energy distribution of the reflection signal; and in case of determining that the second event occurs, providing a second alarm corresponding to the second event according to the energy value of the raw data signal.

20 Claims, 8 Drawing Sheets

(56) References Cited

U.S. PATENT DOCUMENTS

| | | | | |
|---|---|---|---|---|
| 2016/0252610 A1* | 9/2016 | Smith | ..................... | G01S 7/411 |
| | | | | 342/27 |
| 2016/0377704 A1* | 12/2016 | Harash | ................ | G01S 13/0209 |
| | | | | 342/21 |
| 2020/0143656 A1* | 5/2020 | Li | ........................ | G08B 21/043 |
| 2020/0166611 A1 | 5/2020 | Lin et al. | | |
| 2020/0309940 A1* | 10/2020 | Zhao | ........................ | G01S 13/62 |
| 2020/0378758 A1* | 12/2020 | Yang | ...................... | A61B 5/024 |
| 2021/0080556 A1* | 3/2021 | Ogura | .................... | G01S 13/34 |
| 2022/0283292 A1* | 9/2022 | Dvash | ................... | A61B 5/1113 |

FOREIGN PATENT DOCUMENTS

| | | | | |
|---|---|---|---|---|
| JP | 2016170617 | | 9/2016 | |
| JP | 2016177354 | | 10/2016 | |
| JP | 2016218773 | | 12/2016 | |
| JP | 2019158862 | | 9/2019 | |
| JP | 2020071226 | | 5/2020 | |
| KR | 102100639 B1 * | | 4/2020 | ............ A61B 5/024 |
| TW | I653610 | | 3/2019 | |
| TW | 202030701 | | 8/2020 | |
| WO | 2016136400 | | 9/2016 | |
| WO | WO-2021137215 A1 * | | 7/2021 | |

OTHER PUBLICATIONS

Diraco G, Leone A, Siciliano P. A Radar-Based Smart Sensor for Unobtrusive Elderly Monitoring in Ambient Assisted Living Applications. Biosensors. 2017 (Year: 2017).*

Mercuri M, Garripoli C, Karsmakers P, Soh PJ, Vandenbosch GA, Pace C, Leroux P, Schreurs D (2016) Healthcare system for non-invasive fall detection in indoor environment. Springer, Cham, pp. 145-152 (Year: 2016).*

Liang Liu et al., "An automatic in-home fall detection system using Doppler radar signatures," Journal of Ambient Intelligence and Smart Environments, vol. 8, No. 4, Jul. 2016, pp. 453-466.

Liang Liu et al., "Automatic Fall Detection Based on Doppler Radar Motion Signature," 2011 5th International Conference on Pervasive Computing Technologies for Healthcare (PervasiveHealth) and Workshops, May 23-26, 2011, pp. 1-5.

Luis Ramirez Rivera et al., "Radar-Based Fall Detection Exploiting Time-Frequency Features," 2014 IEEE China Summit & International Conference on Signal and Information Processing (ChinaSIP), Jul. 9-13, 2014, pp. 1-5.

"Office Action of Japan Counterpart Application", dated Nov. 30, 2021, p. 1-p. 3.

"Office Action of Taiwan Counterpart Application", dated Jun. 3, 2021, p. 1-p. 7.

"Office Action of Japan Counterpart Application", dated Jul. 5, 2022, p. 1-p. 3.

"Preliminary Report of Japan Counterpart Application", dated Nov. 22, 2022, p. 1-p. 5.

* cited by examiner

NON-CONTACT MOTION DETECTION METHOD, MOTION DETECTION DEVICE AND EMERGENCY DETECTION METHOD

CROSS-REFERENCE TO RELATED APPLICATION

This application claims the priority benefit of Taiwan application no. 109129816, filed on Sep. 1, 2020. The entirety of the above-mentioned patent application is hereby incorporated by reference herein and made a part of this specification.

TECHNICAL FIELD

The disclosure relates to a motion detection method, a motion detection device, and an emergency detection method, and more particularly to a non-contact detection technology that improves a recognition rate for emergency.

BACKGROUND

In the existing motion detection technology, whether a detection object (e.g., elderly, patient or child) has fallen, slipped or collided can be determined by the motion detection technology based on a fast motion of the detection object so that an alarm can be provided accordingly to inform a caregiver of the detection object. Therefore, how to improve the recognition rate of recognition rate for emergency is one of the research topics of those skilled in the art.

SUMMARY

The disclosure provides a non-contact motion detection method and a motion detection device, which can detect a field where a detection object is located and energy of motions of the detection object, so as to improve the accuracy of the situation in the field when the detection object is in danger, and provide the correct alarm.

An embodiment of the disclosure discloses a non-contact motion detection method. The non-contact motion detection method includes: transmitting a detection signal to a field, and receiving a reflection signal corresponding to the field; processing the reflection signal to obtain a raw data signal; calculating a first maintenance time length corresponding to an energy value of the raw data signal continuously being less than a first preset energy value; in response to the first maintenance time length being greater than or equal to a first preset time length, determining that a first event occurs in the field, and providing a first alarm corresponding to the first event; determining whether a second event occurs in the field according to an energy distribution of the reflection signal; in response to the second event that occurs, calculating a second maintenance time length corresponding to the energy value of the raw data signal continuously being less than a second preset energy value; and in response to the second maintenance time length being greater than or equal to a second preset time length, providing a second alarm corresponding to the second event.

An embodiment of the disclosure discloses a motion detection device. The motion detection device includes a detection circuit and a processor. The detection circuit transmits a detection signal to a field, receives a reflection signal corresponding to the field, and processes the reflection signal to obtain a raw data signal. The processor is connected to the detection circuit. The processor calculates a first maintenance time length corresponding to an energy value of the raw data signal continuously being less than a first preset energy value, and when the first maintenance time length is greater than or equal to a first preset time length, determines that a first event occurs in the field, and provides a first alarm corresponding to the first event. The processor further determines that a second event occurs in the field according to an energy distribution of the raw data signal, in case of determining that the second event occurs, calculates a second maintenance time length corresponding to the energy value of the raw data signal continuously being less than a second preset value, and when the second maintenance time length is greater than or equal to a second preset time length, provides a second alarm corresponding to a second event.

An embodiment of the disclosure discloses an emergency detection method. The emergency detection method includes: receiving a reflection radio frequency signal, and processing the reflection radio frequency signal to obtain a raw data signal; processing the raw data signal to obtain an energy response corresponding to a field, and determining a first detection result according to the energy response; in response to the energy response matching a first event, determining whether the first detection result belongs to an emergency; processing the raw data signal according to a motion detection algorithm to obtain a second detection result; and in response to the second detection result matching a first motion, determining whether the second detection result belongs to the emergency.

Based on the above, the disclosure receives the reflection signal from the field and processes the reflection radio frequency signal to obtain the raw data signal. When the first maintenance time length is greater than or equal to the first preset time length, it is determined that the first event occurs in the field, and the first alarm is provided. The disclosure further determines that the second event occurs in the field according to the energy distribution of the raw data signal. In case of determining that the second event occurs, the second alarm is provided when the second maintenance time length is greater than or equal to the second preset time length. In this way, the disclosure can detect the energy generated by the motion of the detection object in the sensing field, so as to improve the accuracy of the situation in the field when the detection object is in danger, and provide the correct alarm.

DETAILED DESCRIPTION

Figure 1:
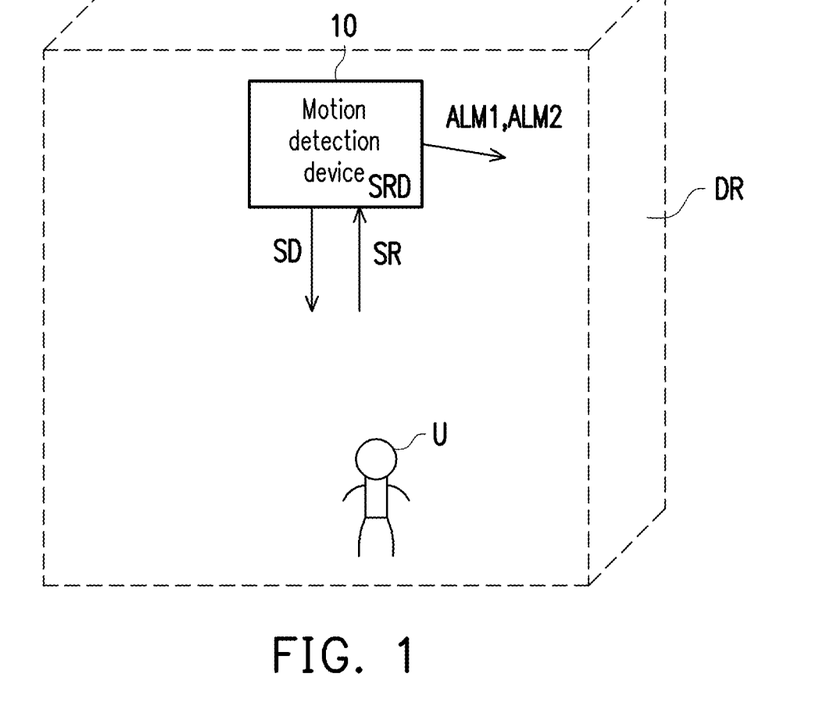
FIG. 1 is a schematic diagram illustrating a motion detection device and a field according to an embodiment of the disclosure.

Referring to FIG. 1, FIG. 1 is a schematic diagram illustrating a motion detection device and a field according to an embodiment of the disclosure. A motion detection device 10 provides a detection signal SD to a field DR, and receives a reflection signal SR from the field DR. The reflection signal SR is, for example, a reflection radio frequency signal. The energy of the reflection signal SR includes the energy generated by any motion in the field DR. The field DR may be at least a part of any indoor space. In this embodiment, the field DR can provide the reflection signal SR corresponding to any motion in the field DR based on the detection signal SD. The motion detection device 10 performs a signal processing on the reflection signal to obtain a raw data signal SRD. The motion detection device 10 then determines whether a first event occurs on a detection object U in the field DR according to the raw data signal SRD, and accordingly provides a first alarm ALM1 corresponding to the first event. In addition, the motion detection device 10 further determines whether a second event occurs on the detection object U in the field DR according to an energy distribution of the raw data signal SRD in time domain, and determines whether to provide a second alarm ALM2 corresponding to the second event according to the energy of the raw data signal SRD when the second event occurs.

Figure 2:
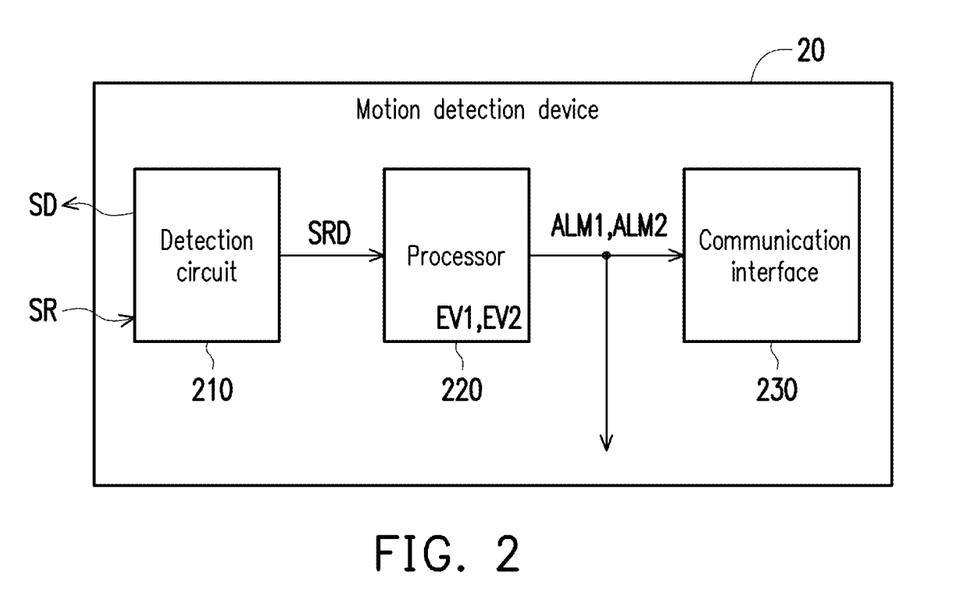
FIG. 2 is a schematic diagram illustrating a motion detection device according to an embodiment of the disclosure.
Figure 4:
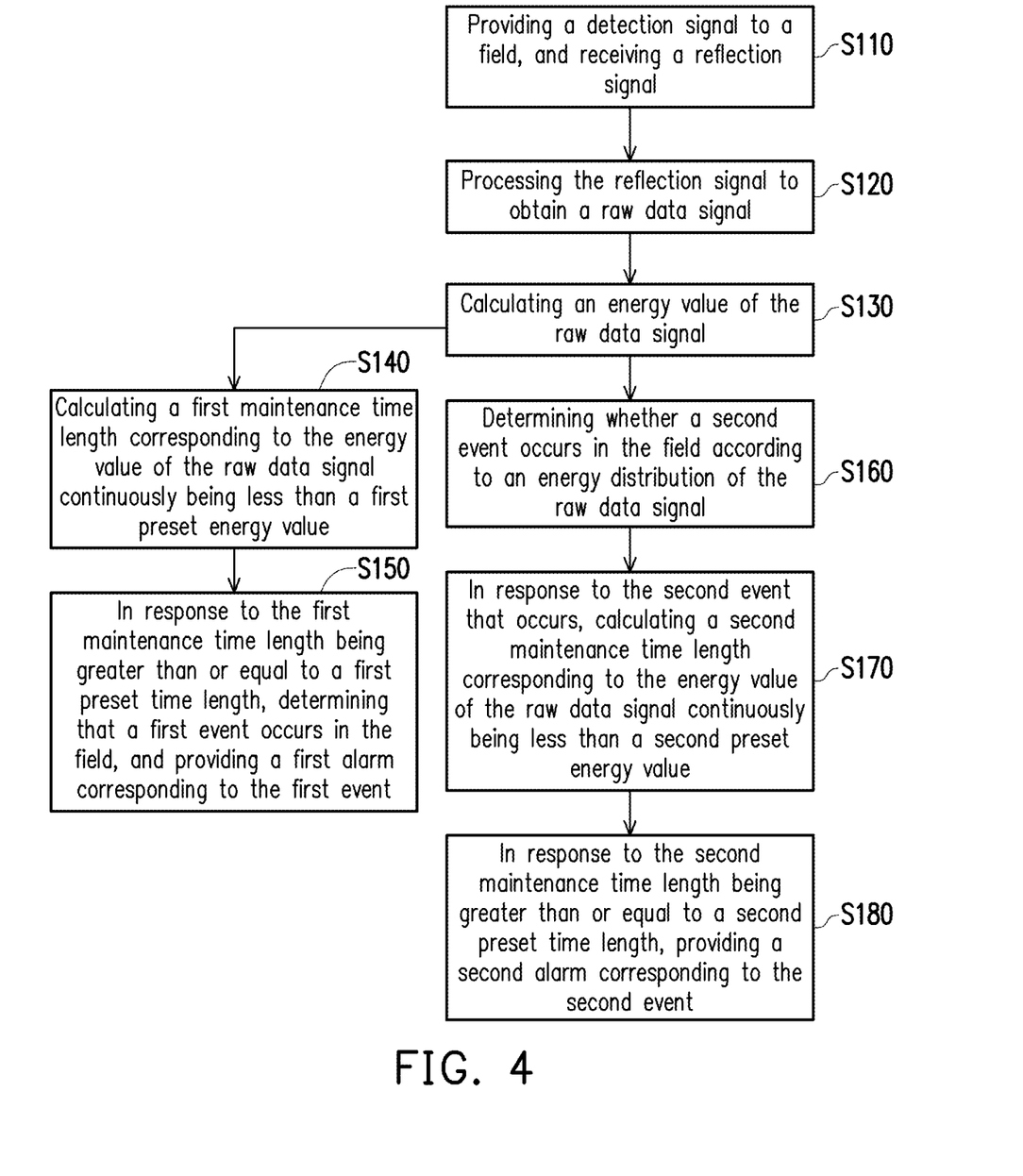
FIG. 4 is a flowchart illustrating a non-contact motion detection method according to an embodiment of the disclosure.

Referring to FIG. 1, FIG. 2 and FIG. 4 together, FIG. 2 is a schematic diagram illustrating a motion detection device according to an embodiment of the disclosure. FIG. 4 is a flowchart illustrating a non-contact motion detection method according to a first embodiment of the disclosure. In this embodiment, a motion detection device 20 includes a detection circuit 210 and a processor 220. The non-contact motion detection method can be applied to the motion detection device 10. The motion detection devices 10 and 20 may be a continuous wave radar. In another embodiment, the motion detection devices 10 and 20 may be a frequency modulated continuous wave radar. The detection circuit 210 includes a radio frequency transceiver and a radio frequency signal processing circuit. In step S110, the detection circuit 210 transmits the detection signal SD to the field DR, and receives the reflection signal SR from the field DR. The field DR may be at least a part of any indoor space. In some embodiments, multiple motion detection devices 10 may be provided to detect a movement state and physiological information of the detection object U in an indoor space. In step S120, the detection circuit 210 performs a signal processing on the reflection signal, and then obtains the reflection signal SRD based on a sampling frequency. In this embodiment, the sampling frequency is 500 Hz (but the disclosure is not limited thereto).

In step S130, the processor 220 is connected to the detection circuit 210 to receive the raw data signal SRD and calculate an energy value of the raw data signal SRD. The processor 220 also filters the raw data signal SRD based on a specific frequency range. The filtering operation may be performed before step S130. In this embodiment, the specific frequency range is between 100 Hz and 250 Hz. The specific frequency range includes a frequency range corresponding to a fast movement or a fast motion (e.g., walking, falling, dropping, sliding, turning over while sleeping, or other body movements) of the detection object U (e.g., elderly, patient, child or caregiver) in the field DR. However, the specific frequency range does not include a frequency range corresponding to a slow movement of the detection object U. The slow movement may be, for example, the displacement change of the detection object U on the surface of the chest cavity caused by breathing or heartbeat. For ease of description, FIG. 2 only shows one single detection object U, but the number of detection objects in the field of the disclosure is not limited to FIG. 2.

In step S140, the processor 220 calculates a first maintenance time length corresponding to an energy value of the raw data signal SRD continuously being less than a first preset energy value. In step S150, in response to the first maintenance time length being greater than or equal to a first preset time length, the processor 220 determines that a first event occurs in the field. When a first maintenance time length TL1 (generated by the energy value of the raw data signal SRD continuously being less than the first preset energy value) is greater than or equal to the first preset time length, the processor 220 determines that a first event EV1 occurs in the field DR. The first event EV1 is an event in which a fast motion does not occur in the field DR within the first preset time length. In step S150, the processor 220 provides the first alarm ALM1 corresponding to the first event EV1.

For example, the first preset energy value is 35 units, such as 35 watts (but the disclosure is not limited thereto). The first preset time length is, for example, 30 minutes. 30 minutes is greater than or equal to the period of limb movement during sleep. The first preset time length may be adjusted according to the actual application situation, and the first preset time length in the disclosure is not limited to the above. In step S130, the processor 220 determines whether the energy value of the raw data signal SRD is less than or equal to 35 watts. When the energy value of the raw data signal SRD is less than or equal to 35 watts, the processor 220 times a maintenance time during which the energy value of the raw data signal SRD is less than or equal to 35 watts to generate the first maintenance time length TL1. When the energy value of the raw data signal SRD is greater than 35 watts, the processor 220 resets the first maintenance time length TL1. On the other hand, when the first maintenance time length TL1 is determined to be greater than or equal to 30 minutes, the processor 220 determines that the first event EV1 occurs in the field DR. The first event EV1 means that the fast motion does not occur in the field DR within 30 minutes. In other words, the first event EV1 means that there is no motion such as walking, turning over while sleeping, or other physical motions in the field DR for over 30 minutes. Accordingly, the processor 220 provides the first alarm ALM1.

When the detection object is having a slow motion, such as paralysis, slow falling or slow sliding, since it is difficult to determine that the detection object is in danger based on the slow motion, a corresponding alarm cannot be provided promptly. Therefore, when the caregiver of the detection object is not on-site, the detection object having paralysis, slow falling or slow sliding is unable to receive any assistance in time. It should be noted here that, the first event EV1 may be an event in which the detection object U in the field DR who is unable to move due to faint, slow falling or paralysis while there is no one in the field DR. The first event EV1 may also be that there is no one in the field DR. Accordingly, the motion detection device 10 can determine that the first event EV1 occurs in the field DR and provide the first alarm ALM1.

Returning to step S130, the processor 220 processes the raw data signal SRD to obtain the energy distribution of the raw data signal SRD. In step S160, the processor 220 performs an analysis according to the energy distribution of the raw data signal SRD, so as to determine whether a second event EV2 occurs in the field DR according to the energy distribution of the raw data signal SRD. The second event EV2 is, for example, a fall event. In step S170, in case of determining that the second event EV2 occurs in the field DR, the processor 220 calculates a second maintenance time length corresponding to the energy value of the raw data signal SRD continuously being less than a second preset energy value. In step S180, in response to a second maintenance time length TL2 being greater than or equal to a second preset time length, the processor 220 provides the second alarm ALM2 corresponding to the second event EV2.

For example, the second preset energy value is 35 units, such as 35 watts (but the disclosure is not limited thereto). The second preset time length is, for example, 5 seconds (but the disclosure is not limited thereto). In step S160, in case of determining that the second event EV2 occurs, the processor 220 determines whether the energy value of the raw data signal SRD is less than or equal to 35 watts. When the energy value of the raw data signal SRD is less than or equal to 35 watts, the processor 220 times a maintenance time during which the energy value of the raw data signal SRD is less than or equal to 35 watts to generate the second maintenance time length TL2. When the energy value of the raw data signal SRD is greater than 35 watts, the processor 220 stops timing or resets the second maintenance time length TL2. When the second sustain time length TL2 is determined to be greater than or equal to 5 seconds, it means that the fast motion does not occur in the field DR for over 5 seconds after the second event EV2 occurs. The above situation may be the fast motion caused by the detection subject U being unable to move (struggling) after falling, and there is no one in the field DR to provide assistance. In this case, the processor 220 correspondingly provides the second alarm ALM2.

In this way, the motion detection device 10 applying the non-contact motion detection method can determine whether the second event EV2 occurs in the field DR, determine whether the detection object U is unable to move after falling in the field DR, and provide the second alarm ALM2 if so. In addition, the motion detection device 10 can also determine that the first event EV1 occurs in the field DR and provide the first alarm ALM1. Accordingly, the motion detection device 10 applying the non-contact motion detection method can detect the energy of the field DR and the energy of the motion of the detection object U, so as to improve the accuracy of the overall situation in the field DR when the detection object U is in danger, and provide the correct alarm.

In this embodiment, the processor 220 of this embodiment is, for example, a central processing unit (CPU) or other programmable devices for general purpose or special purpose such as a microprocessor and a digital signal processor (DSP), micro control unit (MCU), a programmable controller, an application specific integrated circuit (ASIC), a programmable logic device (PLD) or a combination of other similar devices, which can load in computer programs for execution.

In this embodiment, the motion detection device 20 further includes a communication interface 230. The communication interface 230 is coupled to or electrically connected to the processor 220. In this embodiment, the processor 220 transmits the first alarm ALM1 and the second alarm ALM2 to other devices, such as a central control terminal or a cloud server, through the communication interface 230. However, the disclosure is not limited in this regard. The communication interface 230 receives a setting signal (not shown) from the outside of the motion detection device 20, and the processor 220 adjusts an internal setting of the processor 220 according to the setting signal. In another embodiment, the processor 220 transmits one or more of the raw data signal SRD, a partial processing result of the raw data signal SRD, the first alarm ALM1 and the second alarm ALM2 to the other devices through the communication interface 230. The communication interface 230 may be a wired communication interface such as Universal Asynchronous Receiver Transmitter (UART)/Inter-Integrated Circuit Bus (I2C)/Serial Peripheral Interface (SPI)/Controller Area Network (CAN)/Recommended Standard (RS) 232/Recommended Standard (RS) 422 interfaces, and may also be a wireless communication interface such as a wireless sensor network (e.g., EnOcean/Bluetooth/ZigBee), a cellular network (2G/3G/Long Term Evolution Technology (LTE)/5G), a wireless local area network (e.g., Wireless Local Area Network (WLAN)/Global Interoperability for Microwave Connectivity (WiMAX)), a short-distance point-to-point communication (e.g., Radio Frequency Identification (RFID)/EnOcean/Near Field Communication (NFC)) interfaces (but not limited the above).

Figure 3:
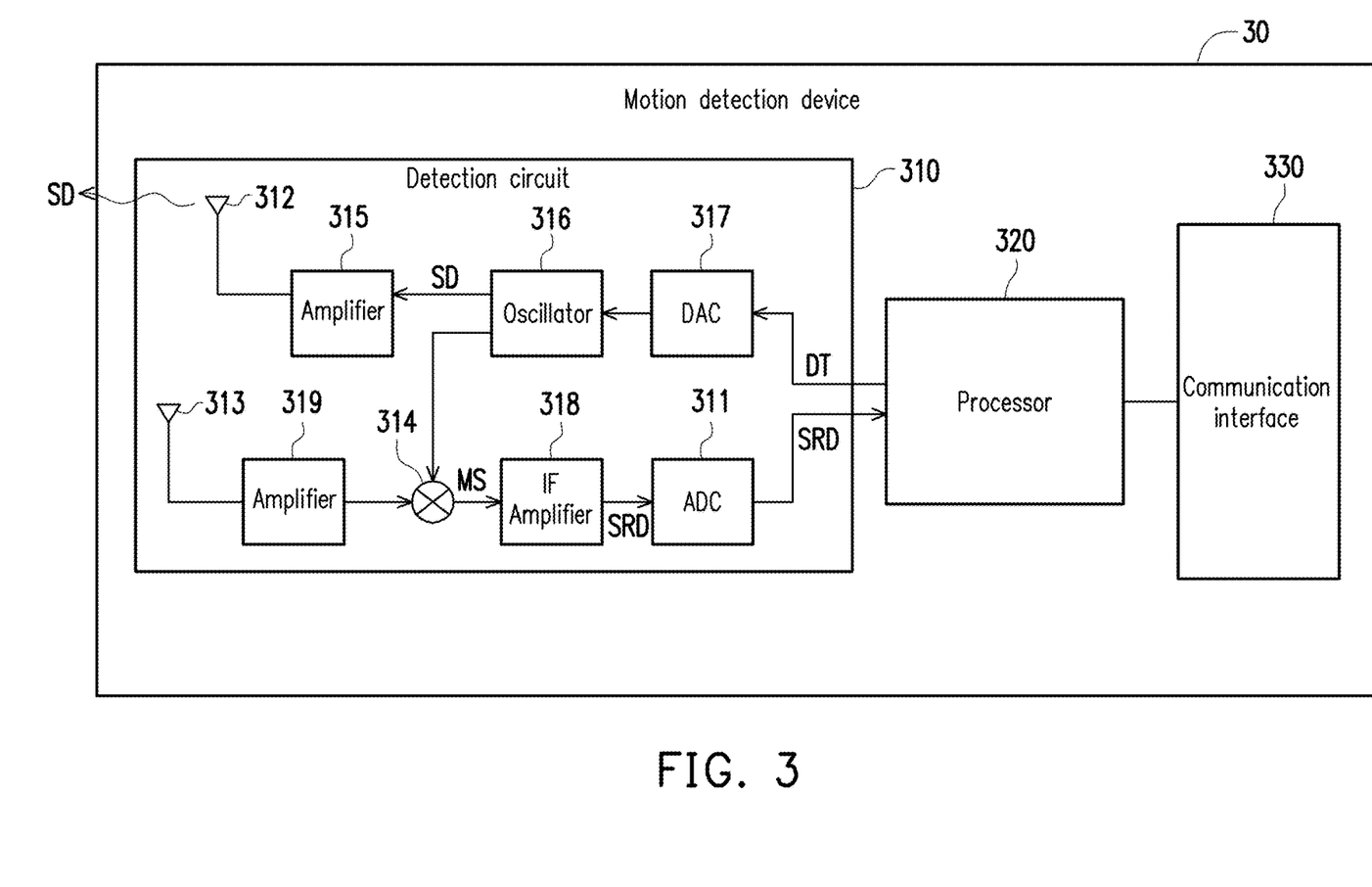
FIG. 3 is a schematic diagram illustrating a motion detection device according to an embodiment of the disclosure.

Referring to FIG. 3, FIG. 3 is a schematic diagram illustrating a motion detection device according to a second embodiment of the disclosure. A motion detection device 30 includes a detection circuit 310, a processor 320 and a communication interface 330. The implementation details of the processor 320 and the communication interface 330 can be sufficiently taught in the embodiment of FIG. 2 and will not be repeated here. In this embodiment, the detection circuit 310 is a continuous wave radar. In other embodiments, the detection circuit 310 may be a detection circuit of other types of millimeter wave radars (e.g., a frequency modulated continuous wave (FMCW) radar or an ultra-wideband (UWB) radar). In this embodiment, the detection circuit 310 includes an analog-to-digital converter (ADC) 311, a transmitting antenna 312, a receiving antenna 313, a mixer 314, an amplifier 315, an oscillator 316, a digital-to-analog converter (DAC) 317, an intermediate frequency (IF) amplifier 318 and an amplifier 319. The digital-to-analog converter 317 is coupled to or electrically connected to the processor 320 to receive digital detection data DT provided by the processor 320. The digital-to-analog converter 317 generates an analog control voltage according to the digital detection data DT. The oscillator 316 is coupled to or electrically connected to the digital-to-analog converter 317. The oscillator 316 receives the analog control voltage and generates a detection signal based on a carrier frequency. The amplifier 315 is coupled to or electrically connected between the transmitting antenna 312 and the oscillator 316. The amplifier 315 gains the detection signal and provides the gained detection signal to the transmitting antenna 312. The transmitting antenna 312 transmits the detection signal to a field. In this embodiment, the detection signal is a radio frequency signal.

The receiving antenna 313 receives a reflection signal from the field. In this embodiment, the reflection signal is a reflection radio frequency signal. The amplifier 319 is a low noise amplifier (LNA). The mixer 314 is coupled or electrically connected to the amplifier 319 and the oscillator 316. The mixer 314 receives the reflection radio frequency signal and the radio frequency signal output by the oscillator 316, and correspondingly obtains a mixed signal MS containing the Doppler component of the reflection radio frequency signal. The intermediate frequency amplifier 318 is coupled or electrically connected to the mixer 314. The intermediate frequency amplifier 318 performs a filtering operation on the mixed signal MS according to a specific frequency band. The intermediate frequency amplifier 318 also gains the mixed signal MS so as to convert the mixed signal MS into the raw data signal SRD. The analog-to-digital converter 311 is coupled or electrically connected between the intermediate frequency amplifier 318 and the processor 220.

Figure 5A:
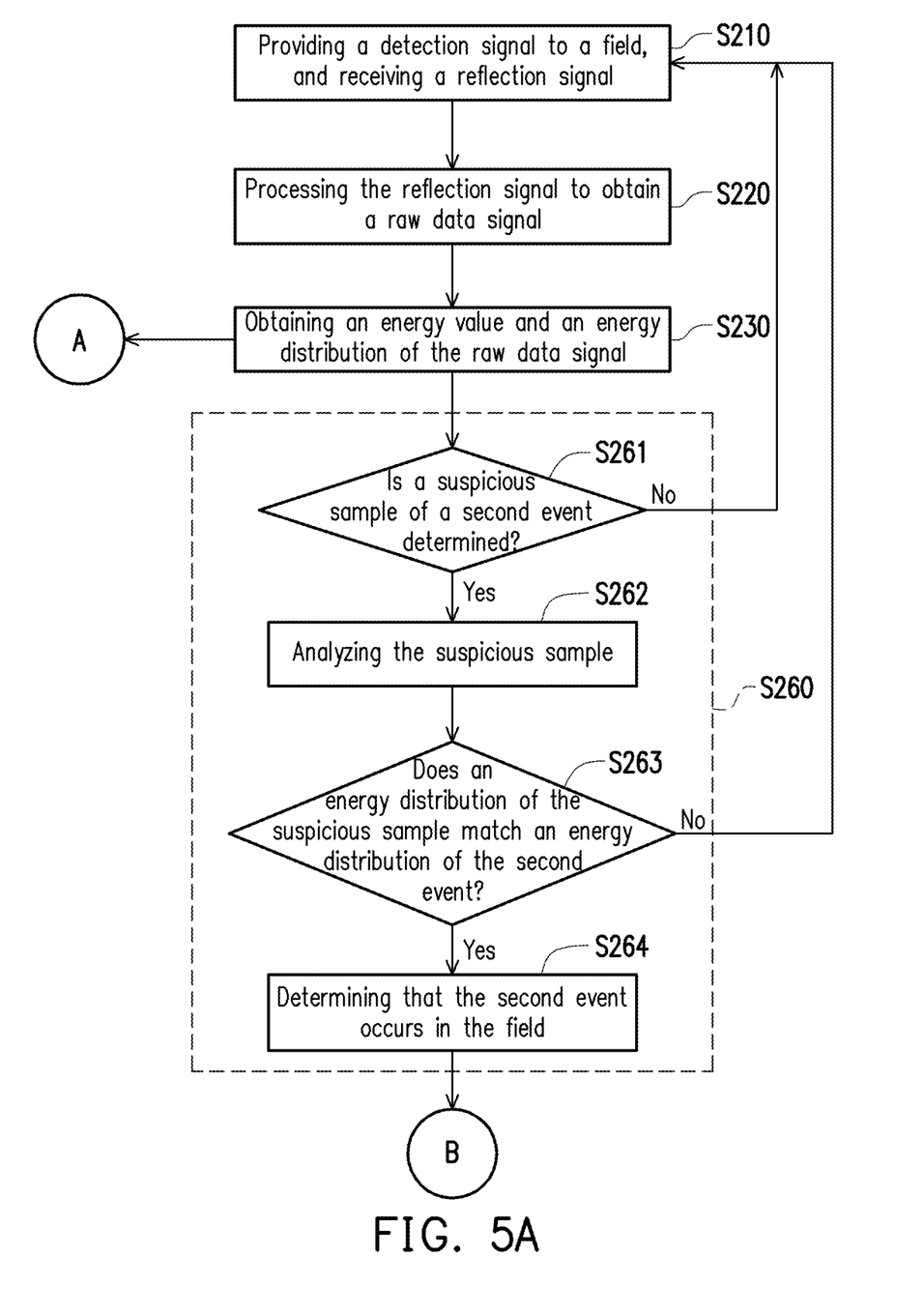
FIG. 5A to FIG. 5C are flowcharts illustrating a non-contact motion detection method according to an embodiment of the disclosure.
Figure 5B:
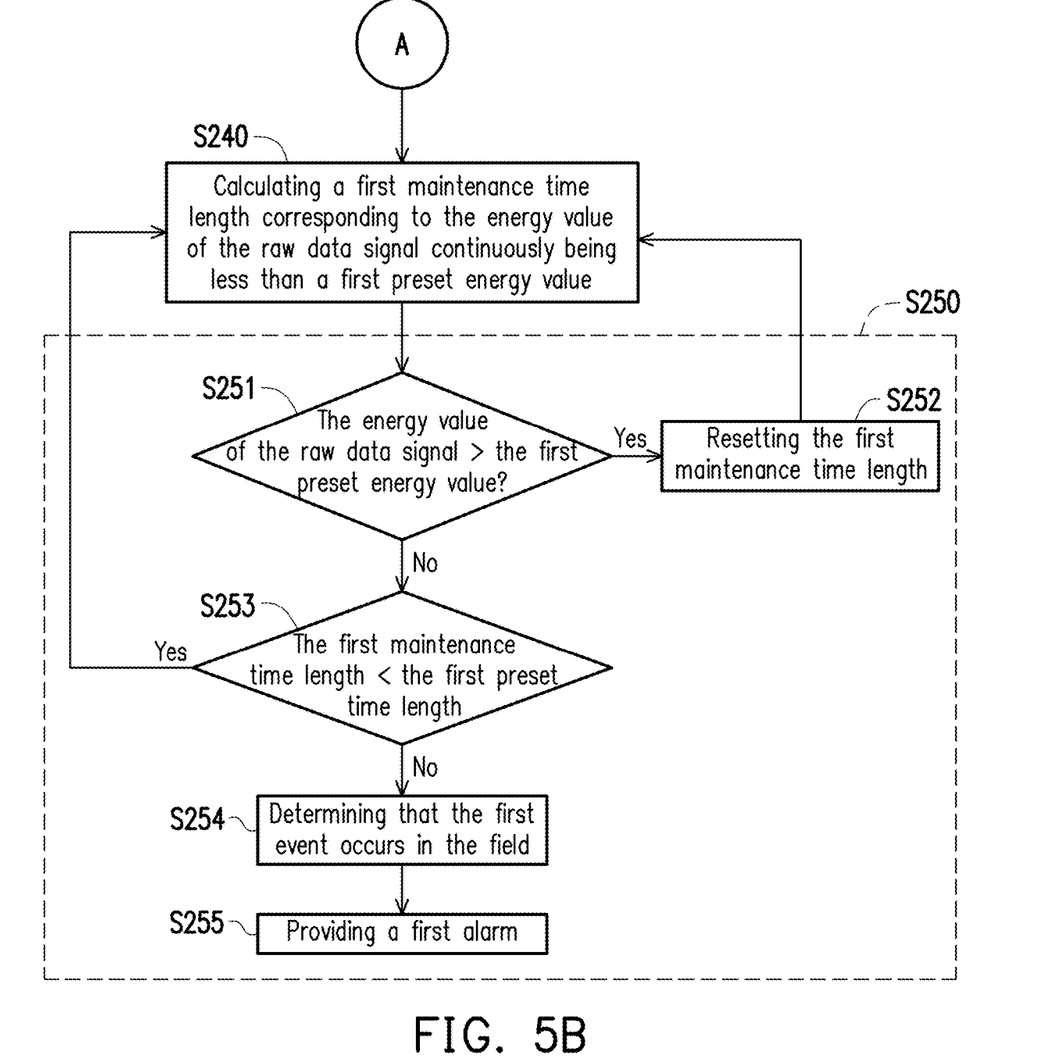
Figure 5C:
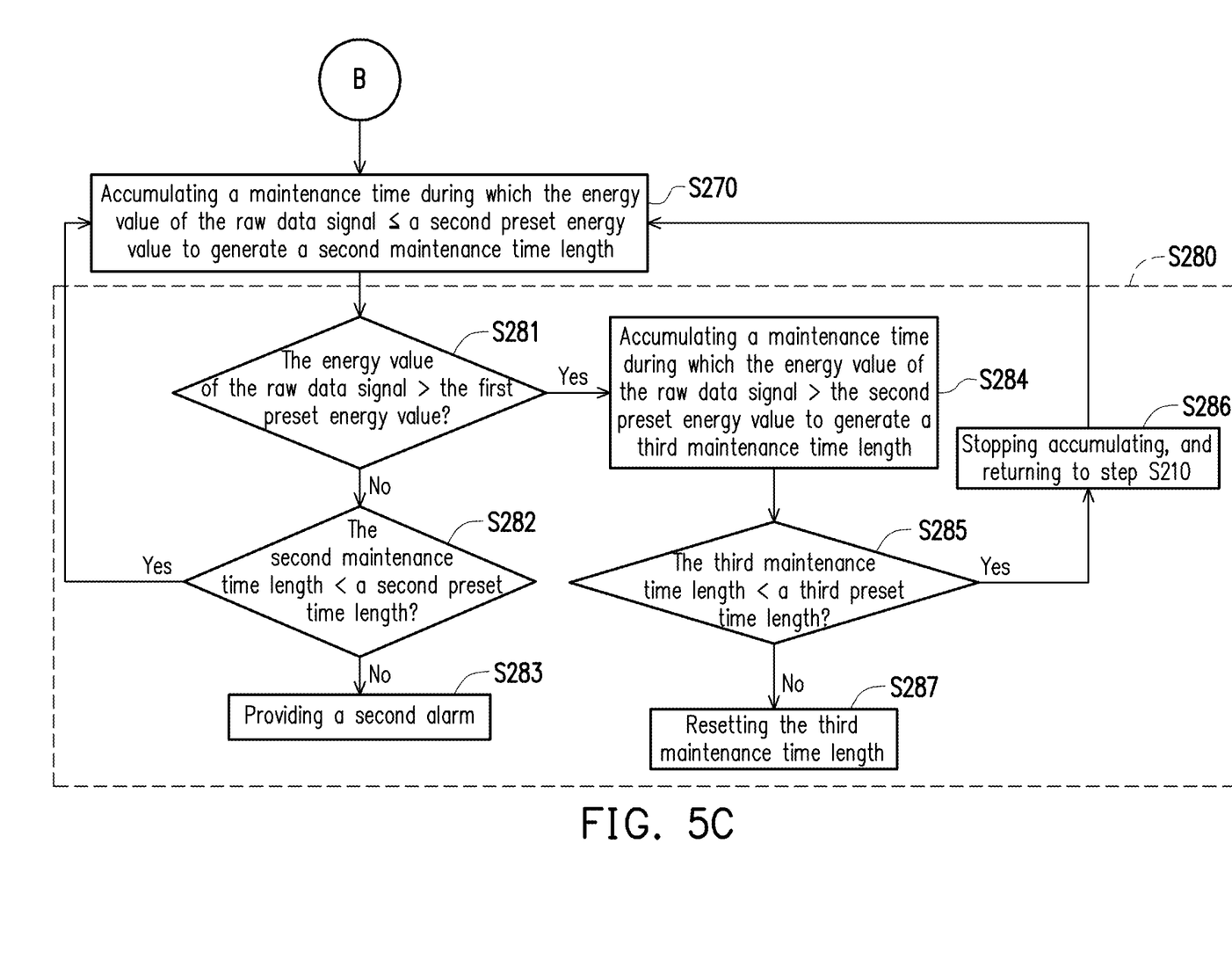
Figure 6:
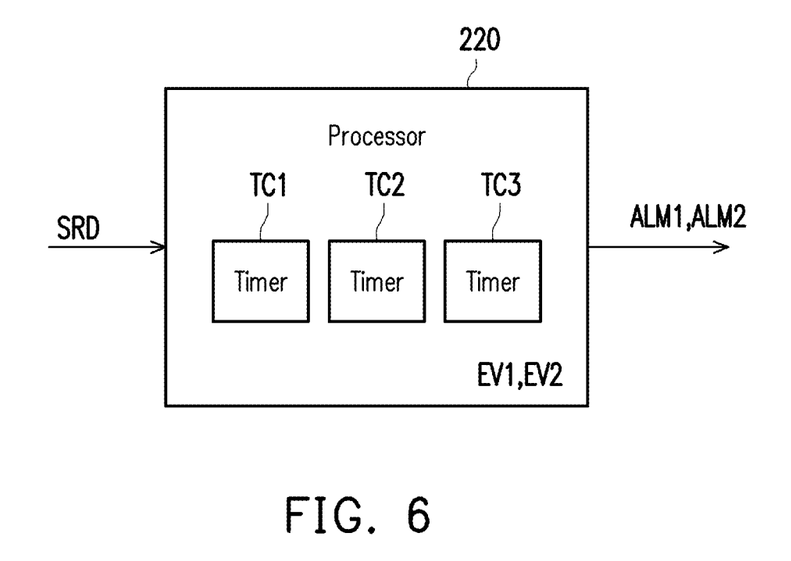
FIG. 6 is a schematic diagram illustrating a processor according to an embodiment of the disclosure.

Referring to FIG. 5A to FIG. 5C and FIG. 6, FIG. 5A to FIG. 5C are flowcharts illustrating a non-contact motion detection method according to the second embodiment of the disclosure. FIG. 6 is a schematic diagram illustrating a processor according to an embodiment of the disclosure. In this embodiment, the processor 220 includes timers TC1 to TC3. The timers TC1 to TC3 are respectively coupled or electrically connected to the processor 220. The processor 220 can be adapted to serve as the motion detection device 10 of FIG. 1. The implementation details in steps S210 and S220 can be sufficiently taught by steps S110 and S120 in the first embodiment, which are not be repeated here. In step S230, the processor 220 converts data of the raw data signal SRD to obtain an energy distribution and an energy value of the raw data signal SRD. In this embodiment, the processor 220 performs a short-time Fourier transform (STFT) on the data of the raw data signal SRD to obtain a frequency-energy distribution of the raw data signal SRD in each time interval. In step S230, the processor 220 obtains the energy distribution and the energy value of a frequency range.

After step S230, the non-contact motion detection method of this embodiment will enter step S260 and enter step S240 via a step node A. In this embodiment, step S260 includes steps S261 to S264. In step S261, the processor 220 determines whether the energy distribution obtained in step S230 is a suspicious sample corresponding to the second event EV2. If the processor 220 determines that the sample is the suspicious sample corresponding to the second event EV2, the processor 220 will enter step S262 to analyze the suspicious sample. In this embodiment, the processor 220 analyzes the energy distribution of the raw data signal SRD according to a motion detection algorithm. The motion detection algorithm is trained by an artificial neural network. The processor 220 may, for example, analyze the suspicious samples by using a machine learning model (but the disclosure is not limited thereto). On the other hand, if determining that the sample is not the suspicious sample corresponding to the second event EV2, the processor 220 returns to step S210. The machine learning model may be a Long Short-Term Memory (LSTM) model, a Recurrent Neural Networks (RNN) model, a Convolutional Neural Networks (CNN) model, and a Deep Neural Network (DNN) model, or a Region-based Convolutional Neural Networks (R-CNN) model.

In step S263, the processor 220 determines whether an energy distribution of the suspicious sample matches an energy distribution of the second event EV2. If the energy distribution of the suspicious sample matches the energy distribution of the second event EV2, the processor 220 determines that the second event EV2 occurs in the field (the field DR shown in FIG. 1) in step S264. Then, the non-contact motion detection method of this embodiment enters step S270 via a step node B. On the other hand, if the energy distribution of the suspicious sample does not match to the energy distribution of the second event EV2, the process returns to step S210.

Figure 7:
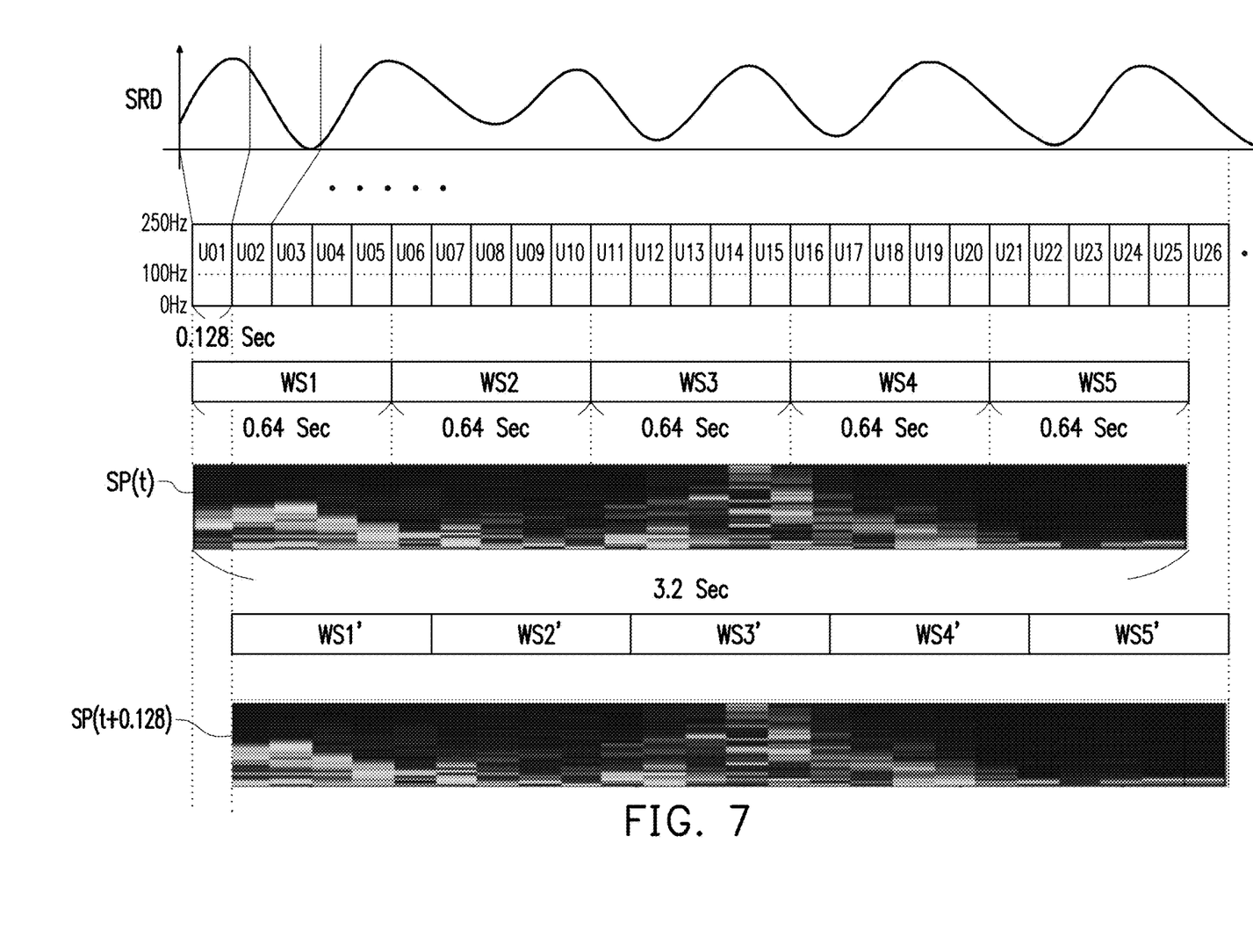
FIG. 7 is a schematic diagram illustrating a conversion of data of a reflection signal into an energy window slot according to an embodiment of the disclosure.

Here, an example is provided below to illustrate the implementation details of steps S230 and S260. Referring to FIG. 1, FIG. 5A and FIG. 7, FIG. 7 is a schematic diagram illustrating a conversion of data of a reflection signal into an energy window slot according to an embodiment of the disclosure. The schematic diagram of FIG. 7 may correspond to step S230. In step S230, the processor 220 receives the data of the raw data signal SRD over time and converts the data of the raw data signal SRD into one single spectrum unit by a unit time length. In this embodiment, the unit time length is, for example, 0.128 seconds. Accordingly, a spectrum unit U01 shows an energy distribution of 0 to 250 Hz in 0 to 0.128 seconds. A spectrum unit U02 shows an energy distribution of 0 to 250 Hz in 0.129 to 0.256 seconds, and the rest can be deduced by analogy. In this embodiment, a segment of 25 consecutive spectrum units U01 to U25 is used for description.

The processor 220 extracts a part of the energy distribution in the spectrum units U01 to U25 based on a frequency range. The frequency range is 100 to 250 Hz. In this embodiment, the processor 220 can filter out the energy distribution below 100 Hz and retain the energy distribution between 100 and 250 Hz. In this way, the energy distribution extracted by the processor 220 includes an energy spectrum generated by the fast motion of the detection object U and excludes an energy spectrum generated by the slow motion of the detection object U. In this way, the processor 220 can reduce the amount of subsequent calculations to save calculation resources. The processor 220 combines multiple adjacent spectrum units into one single energy window slot. For example, the processor 220 combines the spectrum units U01 to U05 into an energy window slot WS1, combines the spectrum units U06 to U10 into an energy window slot WS2, and so on and so forth. Based on this, the processor 220 generates the energy window slots WS1 to WS5. The energy window slots WS1 to WS5 respectively represent an energy distribution change in the frequency range of 100 to 250 Hz in 0.64 seconds. The processor 220 then combines the energy window slots WS1 to WS5 into a sample signal SP(t). A time length of the sample signal SP(t) is 3.2 seconds. Since a time period of a complete fall motion is approximately 2 to 3 seconds, the time length of the sample signal SP(t) is sufficient to detect a complete motion of a suspected falling.

Next, when a spectrum unit U26 is generated, an energy window slot WS1' is generated according to the spectrum units U02 to U06. WS2' is generated based on spectrum units U07 to U11, and the rest can be deduced by analogy. Accordingly, the processor 220 generates the energy window slots WS1' to WS5', and combines the energy panes WS1' to WS5' into a sample signal SP(t+0.128).

In step S261, the processor 220 determines whether an energy intensity of the middle energy window slot WS3 in the sample signal SP(t) is greater than the energy intensities of the other energy window slots WS1, WS2, WS4 and WS5. When the energy intensity of the energy window slot WS3 is determined to be greater than the energy intensities of the energy window slots WS1, WS2, WS4 and WS5, the sample signal SP(t) is determined as the suspicious sample. The non-contact motion detection method includes then enters step S262. On the other hand, when the energy intensity of the energy window slot WS3 is determined to be less than or equal to the energy intensities of the energy window slots WS1, WS2, WS4 and WS5, the non-contact motion detection method returns to step S210.

Referring back to the embodiment of FIGS. 5A to 5C and FIG. 6, the processor 220 calculates the first maintenance time length TL1 in step S240 in this embodiment. In step S240, the processor 220 uses the processor 220 to determine whether the energy value of the raw data signal SRD is less than or equal to the first preset energy value. When the energy value of the raw data signal SRD is determined to be less than or equal to the first preset energy value, the processor 220 instructs the timer TC1 to accumulate a maintenance time during which the energy value of the raw data signal SRD is less than or equal to the first preset energy value, so as to calculate the first maintenance time length TL1. Step S250 includes steps S251 to S255. In step S251, the processor 220 determines whether the energy value of the raw data signal SRD is greater than the first preset energy value. When the energy value of the raw data signal SRD is determined to be greater than the first preset energy value, the processor 220 instructs the timer TC1 to reset the first maintenance time length TL1 in step S252, and executes step S240. That is, because the energy value of the raw data signal SRD is greater than the first preset energy value, the operation of the timer TC1 will be interrupted in step S252, and the timing will be restarted in step S240. On the other hand, when the energy value of the raw data signal SRD is determined to be still less than or equal to the first preset energy value, the processor 220 further determines whether the first maintenance time length TL1 reaches the first preset time length in step S253.

In step S253, when the first maintenance time length TL1 is determined to be less than the first preset time length, the processor 220 performs a step loop of steps S240, S251 and S253. When the first maintenance time length TL1 is determined to be greater than or equal to the first preset time length, the processor 220 determines that the first event EV1 occurs in the field in step S254, and provides the first alarm ALM1 corresponding to the first event EV1 in step S255.

In step S270, the processor 220 determines whether the energy value of the raw data signal SRD is less than or equal to the second preset energy value. When the energy value of the raw data signal SRD is determined to be less than or equal to the second preset energy value, the processor 220 instructs the timer TC2 to accumulate a maintenance time during which the energy value of the raw data signal SRD is less than or equal to the second preset energy value, so as to calculate the second maintenance time length TL2. Step S280 includes steps S281 to S287. In step S281, the processor 220 determines whether the energy value of the raw data signal SRD is greater than the second preset energy value. When the energy value of the raw data signal SRD is determined to be still less than or equal to the second preset energy value, the processor 220 further determines whether the second maintenance time length TL2 reaches the second preset time length in step S282.

In step S282, the processor 220 determines whether the second maintenance time length TL2 is less than the second preset time length (e.g., 5 seconds, but the disclosure is not limited thereto). When the second maintenance time length TL2 is determined to be less than the second preset time length, the processor 220 performs a step loop of steps S270, S281 and S282. On the other hand, when the second maintenance time length TL2 is determined to be greater than or equal to the first preset time length, the processor 220 determines that the fast motion does not occur over the first preset time length after the second event EV2 occurs in the field. The above situation may be caused by the detection subject being unable to move (struggling) after falling, and there is no one in the field to provide assistance. Accordingly, the processor 220 provides the second alarm ALM2 in step S283.

Returning to step S281, when the energy value of the raw data signal SRD is determined to be greater than the second preset energy value, the processor 220 instructs the timer TC3 to accumulate a maintenance time during which the energy value of the raw data signal SRD is greater than the second preset energy value in step S284, so as to generate a third maintenance time length TL3. In step S284, the timer TC2 suspends timing. When the energy value of the raw data signal SRD is determined to be greater than the second preset energy value, it means that the fact motion occurs within 5 seconds after the second event EV2 occurs (i.e., the second maintenance time length TL2 is less than the second preset time length). The above situation may be caused by the detection subject starting to move (struggling) after falling, and there is someone in the field providing assistance. In step S284, if the energy value of the raw data signal SRD is greater than the second preset energy value, the timer TC3 suspends timing. Accordingly, the third maintenance time length TL3 will not be accumulated.

In step S285, the processor 220 determines whether the third maintenance time length TL3 is less than a third preset time length (e.g., 10 seconds, but the disclosure is not limited thereto). When the third maintenance time length TL3 is determined to be less than the third preset time length, the processor 220 instructs the timer TC3 to reset the third maintenance time length TL3 in step S286, and returns to step S270. On the other hand, when the third maintenance time length TL3 is determined to be greater than or equal to the third preset time length, it means that the fast motion of up to 10 seconds occurs after the second event EV2 occurs. The second event EV2 is then determined as being properly handled. Therefore, the processor 220 instructs the timers TC2 and TC3 to end timing in step S287, and returns to step S210.

An embodiment of the disclosure further discloses an emergency detection method. The emergency detection method can be applied to the motion detection devices 10, 20 and 30 shown in FIG. 1 to FIG. 3. The emergency detection method includes: receiving a reflection radio frequency signal (the reflection signal SR shown in FIG. 1 to FIG. 3), and processing the reflection radio frequency signal to obtain a raw data signal (the raw data signal SRD shown in FIG. 1 to FIG. 3); processing the raw data signal to obtain an energy response corresponding to a field, and determining a first detection result according to the energy response; in response to the energy response matching a first event (e.g., the first event EV1 shown in FIG. 2), determining whether the first detection result belongs to an emergency; processing the raw data signal according to a motion detection algorithm to obtain a second detection result; and in response to the second detection result matching an abnormal motion (e.g., falling, sliding, collision or the second event EV2 shown in FIG. 2), determining whether the second detection result belongs to the emergency. For example, the emergency is: (1) the fast motion does not occur for over the first preset time period, or (2) after a first motion occurs, the fast motion does not occur for over the second preset time period.

In summary, the disclosure receives the reflection signal from the field, processes the reflection signal to obtain the reflection signal, and calculates the first maintenance time length corresponding to the energy of the reflection signal continuously being less than the first preset energy value. When the first maintenance time length is greater than or equal to the first preset time length, the disclosure determines that the first event occurs in the field, and provides the first alarm corresponding to the first event. In case of determining that the second event occurs in the field, the disclosure further calculates the second maintenance time length corresponding to the energy value of the raw data signal continuously being less than the second preset energy value. When the second maintenance time length is greater than or equal to the second preset time length, the disclosure provides the second alarm corresponding to the second event. In this way, the disclosure can detect the energy generated by the motion of the detection object in the sensing field, so as to improve the accuracy of the overall situation in the field when the detection object is in danger, and provide the correct alarm.

The invention claimed is:

1. A non-contact motion detection method, comprising:
transmitting a detection signal to a field, and receiving a reflection signal corresponding to the field;
processing the reflection signal to obtain a raw data signal based on a sampling frequency;
calculating a first maintenance time length corresponding to an energy value of the raw data signal continuously being less than a first preset energy value;
determining whether the energy value of the raw data signal is greater than the first preset energy value and whether the first maintenance time length reaches a first preset time length;
in response to the energy value of the raw data signal being less than or equal to the first preset energy value and the first maintenance time length being greater than or equal to the first preset time length, determining that a first event occurs in the field, and providing a first alarm corresponding to the first event;
determining whether a second event occurs in the field according to an energy distribution of the raw data signal;
in response to the second event that occurs, calculating a second maintenance time length corresponding to the energy value of the raw data signal continuously being less than a second preset energy value; and
in response to the second maintenance time length being greater than or equal to a second preset time length, providing a second alarm corresponding to the second event.

2. The non-contact motion detection method of claim 1, wherein before calculating the energy value of the raw data signal, the method further comprises filtering the raw data signal based on a frequency range.

3. The non-contact motion detection method of claim 1, wherein the step of calculating the first maintenance time length corresponding to the energy value of the raw data signal continuously being less than the first preset energy value comprises:
when the energy value of the raw data signal is less than the first preset energy value, timing a maintenance time during which an energy value of the reflection signal is less than the first preset energy value to generate the first maintenance time length.

4. The non-contact motion detection method of claim 3, wherein the step of calculating the first maintenance time length corresponding to the energy value of the raw data signal continuously being less than the first preset energy value further comprises:
when the energy value of the reflection signal is greater the first preset energy value, resetting the first maintenance time length.

5. The non-contact motion detection method of claim 1, wherein in response to the second event that occurs, the step of calculating the second maintenance time length corresponding to the energy value of the raw data signal continuously being less than the second preset energy value comprises:
in case of determining that the second event occurs, timing a time length during which the energy value of the raw data signal is continuously less than the second preset energy value to generate the second maintenance time length.

6. The non-contact motion detection method of claim 5, further comprising:
in case of determining that the second event occurs, timing a time length during which the energy value of the raw data signal is continuously greater than the second preset energy value to generate a third maintenance time length; and
when the third maintenance time length is less than a third preset time length, resetting the third maintenance time length.

7. The non-contact motion detection method of claim 6, further comprising:
in case of determining that the second event occurs, stopping timing when the third maintenance time length is greater than or equal to the third preset time length.

8. The non-contact motion detection method of claim 1, wherein the first event is an event in which a fast motion does not occur in the field within the first preset time length.

9. The non-contact motion detection method of claim 1, wherein the second event is a fall event that occurs in the field.

10. The non-contact motion detection method of claim 1, wherein the step of determining whether the second event occurs in the field according to the energy distribution of the raw data signal further comprises:
analyzing the energy distribution of the raw data signal according to a motion detection algorithm, wherein the motion detection algorithm is trained by an artificial neural network.

11. A motion detection device, comprising:
a detection circuit, transmitting a detection signal to a field, receiving a reflection signal corresponding to the field, and processing the reflection signal to obtain a raw data signal based on a sampling frequency; and
a processor, coupled to the detection circuit, and configured to:
calculate a first maintenance time length corresponding to an energy value of the raw data signal continuously being less than a first preset value;
determine whether the energy value of the raw data signal is greater than the first preset energy value and whether the first maintenance time length reaches a first preset time length;
when the energy value of the raw data signal is less than or equal to the first preset energy value and the first maintenance time length is greater than or equal to the first preset time length, determine that a first event occurs in the field, and provide a first alarm corresponding to the first event;
determine that a second event occurs in the field according to an energy distribution of the raw data signal;
in case of determining that the second event occurs, calculate a second maintenance time length corresponding to the energy value of the raw data signal continuously being less than a second preset value; and
when the second maintenance time length is greater than or equal to a second preset time length, provide a second alarm corresponding to the second event.

12. The motion detection device of claim 11, wherein before calculating the energy value of the raw data signal, the processor performs a filtering operation on the raw data signal based on a frequency range.

13. The motion detection device of claim 11, wherein the processor comprises:
 a first timer, configured to, when the energy value of the raw data signal is less than the first preset energy value, accumulate a maintenance time during which the energy value of the raw signal is less than the first preset energy value to generate the first maintenance time length.

14. The motion detection device of claim 13, wherein the processor further comprises:
 a second timer, configured to, in case of determining that the second event occurs, accumulate a time length during which the energy value of the raw data signal is continuously less than the second preset energy value to generate the second maintenance time length.

15. The motion detection device of claim 14, wherein the processor further comprises:
 a third timer, configured to, in case of determining that the second event occurs, timing a time length during which the energy value of the raw data signal is continuously greater than the second preset energy value to generate a third maintenance time length,
 wherein when the processor determines that the third maintenance time length is less than a third preset time length, the processor resets the third timer.

16. The motion detection device of claim 15, wherein in case of determining that the second event occurs, the processor instructs the third timer to stop timing when determining that the third maintenance time length is greater than or equal to the third preset time length.

17. The motion detection device of claim 11, wherein the first event is an event in which a fast motion does not occur in the field within the first preset time length.

18. The motion detection device of claim 11, wherein the second event is a fall event that occurs in the field.

19. The motion detection device of claim 11, wherein the motion detection device is a continuous wave radar, and the detection circuit is a radio frequency transceiver.

20. An emergency detection method, comprising:
 receiving a reflection radio frequency signal, and processing the reflection radio frequency signal to obtain a raw data signal based on a sampling frequency;
 processing the raw data signal to obtain an energy response corresponding to a field, and determining a first detection result according to the energy response, wherein the first detection result comprises a first result determined by whether an energy value of the raw data signal is greater than a first preset energy value and a second result determined by whether a first maintenance time length reaches a first preset time length, wherein the first maintenance time length corresponds to the energy value of the raw data signal continuously being less than the first preset energy value;
 in response to the energy response matching a first event, determining whether the first detection result belongs to an emergency;
 processing the raw data signal according to a motion detection algorithm to obtain a second detection result; and
 in response to the second detection result matching a first motion, determining whether the second detection result belongs to the emergency.

* * * * *